US012510397B2

United States Patent
Moua et al.

(10) Patent No.: US 12,510,397 B2
(45) Date of Patent: Dec. 30, 2025

(54) LEVEL MEASUREMENT IN CONTAINERS

(71) Applicant: Alps Alpine Co., Ltd., Tokyo (JP)

(72) Inventors: Xeng Moua, Rochester Hills, MI (US); Prudencio Cabigao, Rochester Hills, MI (US); Levi Hellebuyck, Shelby Township, MI (US); Zachary Denny, South Lyon, MI (US); Carlos Velasquez, Rochester Hills, MI (US)

(73) Assignee: Alps Alpine Co., Ltd. (JP)

( * ) Notice: Subject to any disclaimer, the term of this patent is extended or adjusted under 35 U.S.C. 154(b) by 301 days.

(21) Appl. No.: 18/316,215

(22) Filed: May 11, 2023

(65) Prior Publication Data
US 2024/0377239 A1    Nov. 14, 2024

(51) Int. Cl.
*G01F 23/284* (2006.01)
*H01Q 1/22* (2006.01)

(52) U.S. Cl.
CPC ........... *G01F 23/284* (2013.01); *H01Q 1/225* (2013.01)

(58) Field of Classification Search
CPC .............. G01F 23/284; H01Q 1/225
See application file for complete search history.

(56) References Cited

U.S. PATENT DOCUMENTS

| | | | |
|---|---|---|---|
| 8,195,590 B1* | 6/2012 | Coggins | G01F 25/0084 706/14 |
| 2016/0202105 A1* | 7/2016 | Baer | G01F 23/284 324/633 |
| 2016/0282168 A1* | 9/2016 | Fehrenbach | G01F 23/241 |
| 2017/0262668 A1* | 9/2017 | Lim | H04W 4/80 |
| 2017/0340147 A1* | 11/2017 | Hambrock | G16H 20/60 |
| 2020/0249070 A1* | 8/2020 | Gurumohan | G01F 23/804 |
| 2020/0355536 A1* | 11/2020 | Welle | G08B 21/182 |
| 2021/0318159 A1* | 10/2021 | Dieterle | G01F 23/284 |
| 2021/0375115 A1* | 12/2021 | Roy | G08B 27/005 |

FOREIGN PATENT DOCUMENTS

WO    2007-053007 A1    5/2007

* cited by examiner

*Primary Examiner* — Vladimir Magloire
*Assistant Examiner* — Nazra Nur Waheed
(74) *Attorney, Agent, or Firm* — Harness, Dickey & Pierce, P.L.C.

(57) ABSTRACT

A fill level measuring system for a container includes a housing and a radar module in the housing. A data exchange control module is in the housing and in communication with the radar module for transmitting information from the radar module to a user device. A battery is in the housing and is connected to the radar module and the data exchange control module.

18 Claims, 3 Drawing Sheets

LEVEL MEASUREMENT IN CONTAINERS

FIELD

The present disclosure relates to a liquid level measurement in containers.

BACKGROUND

This section provides background information related to the present disclosure which is not necessarily prior art.

Intermediate bulk containers (IBCs) are industrial-grade containers engineered for the mass handling, transport, and storage of liquids. It is common for IBCs to be used together in bulk so therefore, many end users of these containers need to know the fill level remaining. Technologies currently exist to detect the fill level of these containers to alert the user when they become low or empty. The traditional non-contact technologies are normally mounted on the top of the container looking down into it. Scenarios exist where the top of the container is not available for mounting. This could include containers being stacked vertically during use or space constraints. Other technologies can sit inside the container and contact the liquid which would avoid the space constraints. The issue is the device can react to the liquid in the container and cause it not to function. Also, an in-container liquid measuring device may have to be removed at some point. This is undesirable to the end user because the liquid could be hazardous.

The present disclosure is directed to the detection of a fill level of a container. Prior systems have used ultrasonic liquid level sensors that are mounted to the interior top of a container and send a sound signal toward the liquid to determine a distance that the liquid is away from the sensor. A drawback of ultrasonic liquid level sensors is it that they are easily affected by temperature changes, vapor or humidity between the sensor and liquid level surface.

Capacitive liquid level sensors have also been used within containers with a capacitive strip entering the liquid. The liquid level is determined from reading the change in capacitance between the dielectric of liquid and the air. A problem with capacitive liquid level sensors is that they are a contact solution. This means they need to be placed in the container with the liquid and then removed when the tank is being stored. This is also undesirable to the end user because contact with the sensor exposed to the liquid may not be safe to people.

Float level switches have also been used for liquid level detection. When the liquid level reaches the float, the float raises up and triggers a switch. The main drawback with a float level switch is it doesn't tell you the fill level, it only detects when the liquid level reaches the threshold of the float switch. Like the capacitive solution, the float level switch is a contact solution and needs to sit inside the container.

A radar level transmitter is another example of a liquid level sensor. It is normally mounted to the top of a container and emits a high frequency RF pulse from its antenna. The pulse will penetrate the container material and reflect off the liquid and return to the radar antenna. The liquid level is determined based on how long the pulse takes to return to the radar. The downside to radar is that it is normally in a larger package due to the required circuitry and components. It is difficult to package in an application that requires limited space. Typical radars are normally not conducive to battery powered application because of its high-power consumption.

SUMMARY

This section provides a general summary of the disclosure and is not a comprehensive disclosure of its full scope or all of its features.

According to an aspect of the present disclosure, a fill level measuring system for a container includes a housing and a radar module in the housing. A data exchange control module is in the housing and in communication with the radar module for transmitting information from the radar module to a user device. A battery is in the housing and is connected to the radar module and the data exchange control module.

According to a further aspect of the present disclosure, a container includes a base and a sidewall extending from the base. A fill level measuring device is mounted to the sidewall and includes a housing and a radar module in the housing. A data exchange control module is in the housing and in communication with the radar module for transmitting information from the radar module to a user device. A battery is in the housing and is connected to the radar module and the data exchange control module.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
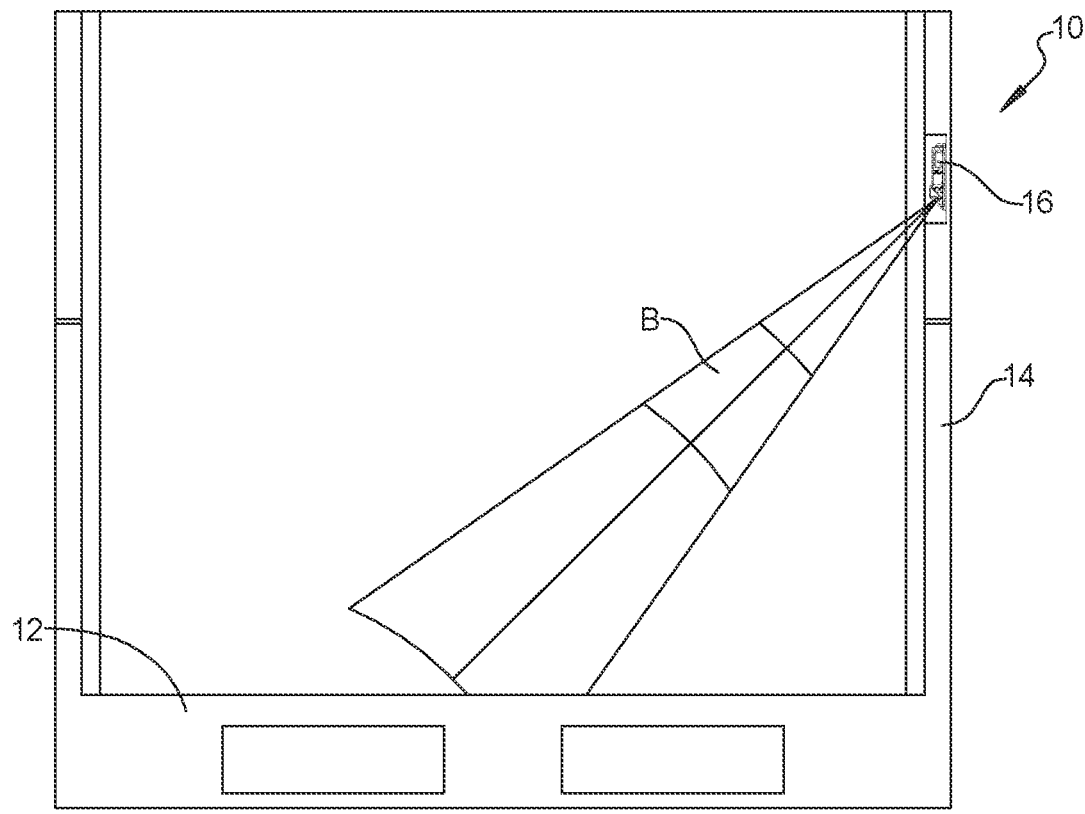
FIG. 1 is a schematic view of a container having a fill level measuring system according to the principles of the present disclosure.
Figure 2:
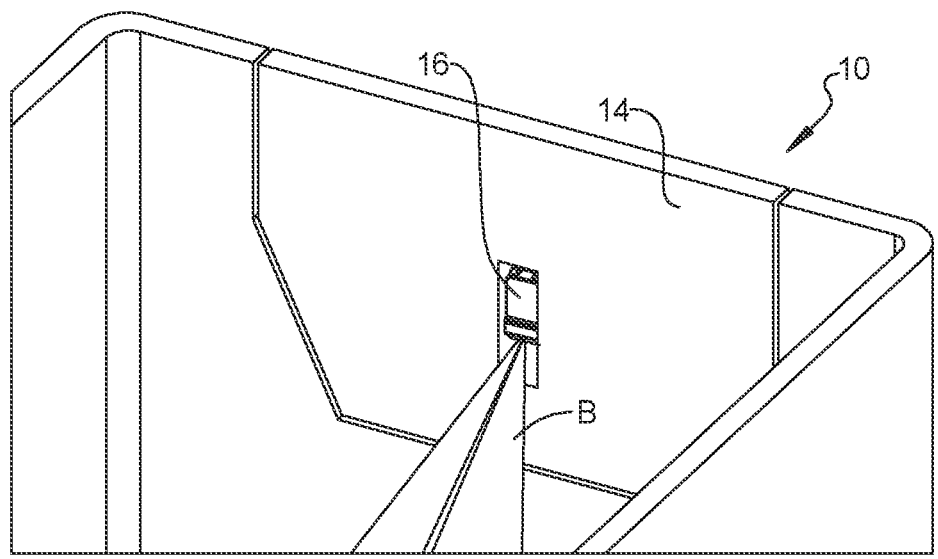
FIG. 2 is a partial perspective view of a container having a fill level measuring system according to the principles of the present disclosure.

With reference to FIGS. 1 and 2, a container 10 includes a base 12 and a side wall 14 extending upward from the base 12. A level measuring system 16 according to the principles of the present disclosure is mounted to the sidewall 14. The level measuring system 16 can be removably mounted to the sidewall 14.

Figure 3:
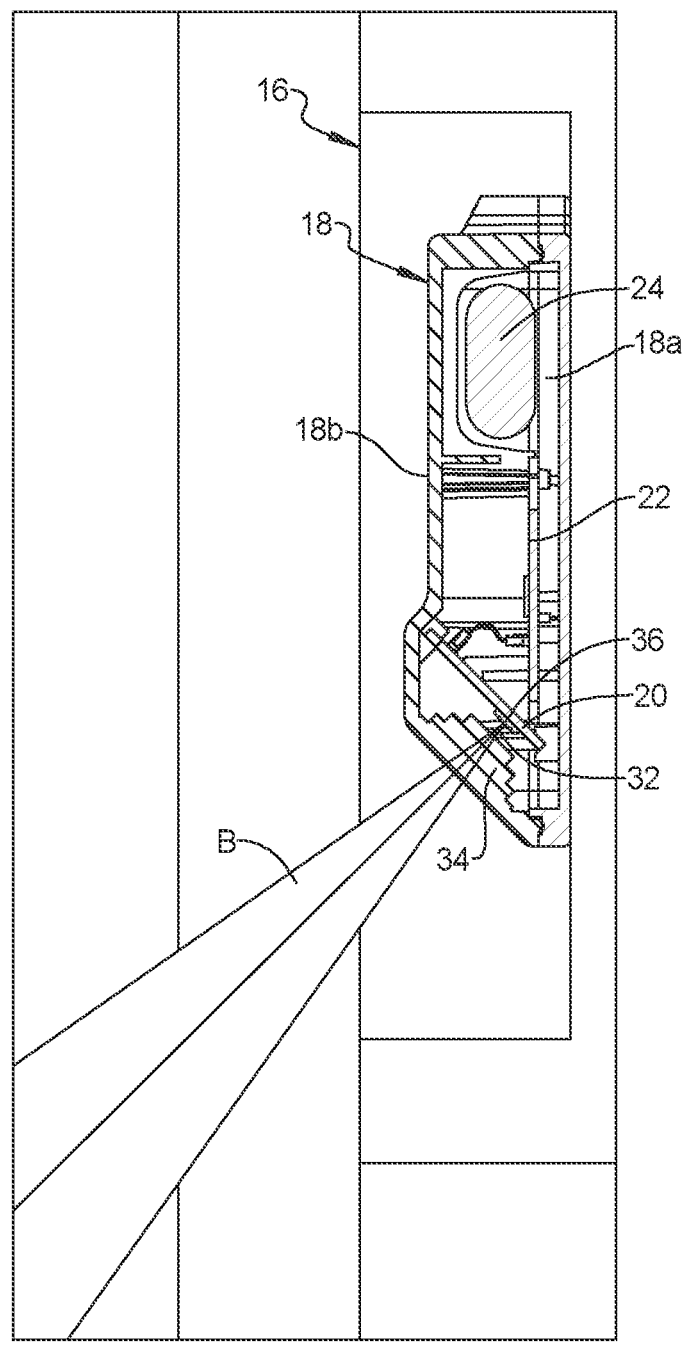
FIG. 3 is a cross-sectional view of a fill level measuring system on a sidewall of the container.

With reference to FIG. 3, the level measuring system 16 includes a housing 18 having a base 18*a*, and a cover 18*b*. A radar module 20 is mounted in the housing 18. A data exchange control module 22 is in the housing and in communication with the radar module 20 for wirelessly transmitting information from the radar module 20 to a user device. A battery 24 is provided in the housing 18 and is connected to the radar module 20 and the data exchange control module 22. The electronics can be implemented on two printed wiring boards (PWB). One may be a dedicated radar PWB which allows its orientation to match the angle of the lens while maintaining a small form factor. The other PWB may have other electronic components. The radar is implemented as a radar integrated circuit (IC) for distance measurement. This radar chip is a small, low cost, low power consumption component compared to traditional radars. In some cases, the distance measurements are 7 meters or less. In some case, the containers 10 are only 1 to 2 meters in height. By having the radar on a separate printed wiring board looking out the angled lens, the printed wiring board may be small enough to meet the height requirement to fit the recessed pocket of the collapsible container 10. The level measuring system 16 may be able to monitor liquid level detection until the container is completely empty. When the container is empty, it can be collapsed and stored away.

Figure 4:
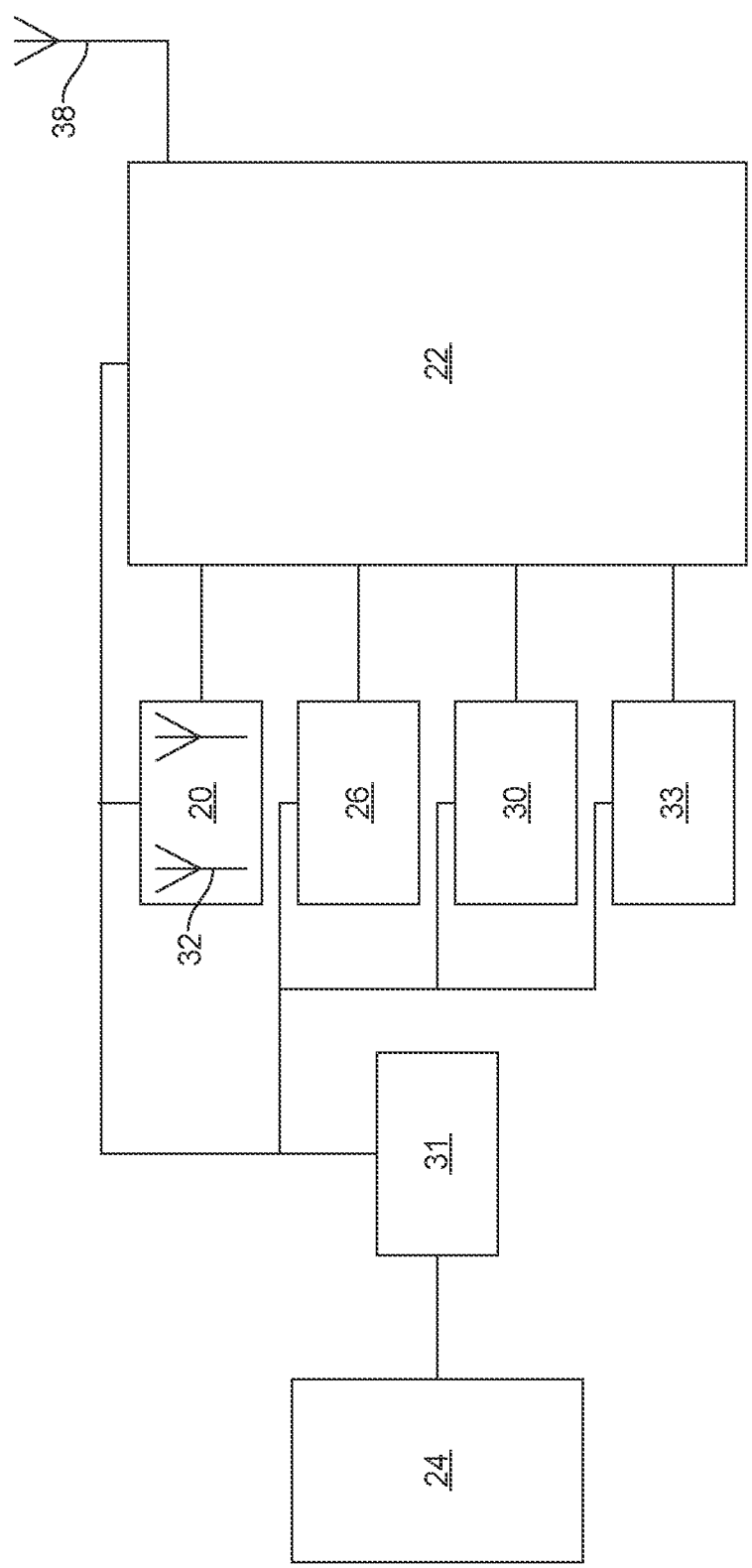
FIG. 4 is a circuit diagram of the fill level measuring system.

With reference to FIG. 4, an use condition detection module 26 is disposed in the housing 18 and is in communication with the data exchange control module 22. The use condition detection module 26 can include an accelerometer that can detect whether the level measuring system 16 is in a vertical, use position. When the accelerometer is in the vertical, use position, the data exchange control module 22 is activated to control the radar module 20 to measure the fill level within the container 10. When the accelerometer is in a horizontal, non-use position (such as when the container is folded into a non-use position), the data exchange control module 22 is inactivated in order to conserve battery power. In the case of a foldable container, the use condition detection module 26 is capable of determining if the level measuring system 16 is in a position (typically a vertical position) indicative of the container being unfolded into a construction for holding materials or liquids. If the use condition detection module 26 detects a position of the level measuring system 16 in any position other than a use position, the use condition detection module 26 would deactivate the radar control module 20 and the data exchange control module 22.

It should be understood that the use condition detection module 26 can take on other alternative forms of vibration sensors, impact sensors, motion or movement sensors, etc. that may indicate that the container is in use so that the fill level monitoring system 16 can be activated. Similar to the accelerometer discussed above, the detection of vibrations, impacts, motions or movements can be indicative that the container is being used, while the lack of any detected vibrations, impacts, motions or movements can be indicative that the container is not being used so that the use condition detection module 26 would deactivate the radar control module 20 and the data exchange control module 22. With reference to FIG. 4, a battery monitoring circuit 30 is provided for monitoring a battery charge level of the battery 24 and providing a low battery signal to the data exchange control module 22 when the battery charge level is below a predetermined level. A voltage regulator 31 controls the output from the battery 24 to the radar module 20. The data exchange control module 22 controls the radar module via a magnet activation switch 33.

As shown in FIG. 3, the radar module 20 includes an antenna 32 that is angled toward the base 12 of the container 10. The antenna 32 transmits a high frequency RF signal through an optional lens 34 that can be supported by the cover 18*b* of the housing 18. The antenna 32 can be disposed on an integrated circuit 36. The antenna 32 can be angled in its mounted position on the sidewall so as to deliver a radar beam B toward the base 12 of the container 10. In the embodiment shown, the antenna 32 is angled downward into the container 10 at an angle of between 25 to 65 degrees, more preferably 35 to 55 degrees and most preferably approximately 45 degrees from horizontal.

The data exchange control module 22 can include a data exchange transmitter 38 for transmitting wireless signals (such as BLUETOOTH) to a user. The data exchange control module 22 also controls the activation of the radar module 20 in response to the use condition detection module 26 indicating that the container 10 is in use. The data exchange control module 22 can be programmed to activate the radar module 20 at predetermined intervals based upon the intended use of the containers 10. The data exchange control module 22 can transmit the data from the radar module 20 out of the container to a centralized unit where the fill level of multiple containers can be monitored. The data exchange control module 22 can also include send an identification signal along with information from the radar module 20 to a user, so that a user will know which container 10 needs to be changed out (emptied or re-filled).

In use, the antenna 32 of the radar module 20 is activated to create a radar beam B toward the material in the bin and a bounce back signal is received by the radar module 20. Based upon the time interval of the bounce back signal, the radar module 20 can determine a level of the material within the container 10. Depending upon whether the material in the container 10 is being used up or is being added to the container, the data exchange control module 22 of the fill level measuring system 16 can transmit a warning signal via a wireless transmitter to a user that the container 10 is either empty (or close to empty) or full (or close to full). The fill level measuring system of the present disclosure allows a fill level of a container to be continuously monitored to avoid an undesirable over-fill or empty condition depending upon the intended use of the container. The fill level measuring system has a low profile that allows the system to be stored in a recess in a sidewall of the container and allows the container to folded flat without interference. Where the container is collapsible, the radar module may be at least flush (non-protruding) with the inside of the collapsible wall. Thus, when the wall is folded down, the radar module may not interfere with stacking the walls on top of each other. In the embodiment as shown in FIGS. 1 and 2, the container has a side door, and the sensor is either accessible through the side door, or the sensor is mounted in the side door.

The use condition detection module 26 allows the fill level sensing system 16 to be stored for lengthy periods of time without depleting the battery or pulling energy from another power source.

The fill level measuring system can be used for measuring liquids such as water, oil, paint, etc., or dry contents such as, but not limited to, measuring a level of mail in a post office setting, a level of grain in an agricultural setting, a level of aggregate in quarry and mining settings, a level of components in a manufacturing setting and a level of waste material in other settings. For example, when it is used for a mailbox letter detection, the fill level measuring system may be placed on the side door looking down at the mail at an angle. The mail level can be reported to the mail service company when the mailbox is filled and needs to be picked up. This can be useful for busy mailboxes where mail needs to be picked up more frequently.

Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fill level measuring system for a container, comprising:
    a housing in a longitudinal shape elongating along a first direction;
    a radar module in the housing;
    a data exchange controller in the housing and in communication with the radar module, the data exchange controller being configured to transmit information from the radar module to a user device;
    a use condition detection sensor configured to:
        detect a first state and a second state of the housing, the first state being a state in which the first direction is perpendicular to a bottom of the container, the second state being a state in which the first direction is parallel to the bottom of the container; and
        generate a detection result; and
    a power source in the housing and connected to the radar module and the data exchange controller,
    wherein each of the radar module and the data exchange controller is in an active state in response to the detection result corresponding to the first state, and
    each of the radar module and the data exchange controller is in a non-active state in response to the detection result corresponding to the second state.

2. The fill level measuring system according to claim 1, wherein the use condition detection sensor is an accelerometer.

3. The fill level measuring system according to claim 1, wherein the power source is a battery and further comprising a battery monitoring circuit for monitoring a battery charge level of the battery and providing a low battery signal to the data exchange controller when the battery charge level is below a predetermined level.

4. The fill level measuring system according to claim 1, wherein the radar module includes an antenna that is mounted on an integrated circuit or a printed circuit board.

5. The fill level measuring system according to claim 4, wherein the housing includes a lens adjacent to the antenna.

6. The fill level measuring system according to claim 1, wherein the radar module is configured to determine a distance that a material is filled within the container.

7. The fill level measuring system according to claim 1, wherein the data exchange controller is further configured to control the radar module to detect a level of a material within the container.

8. The fill level measuring system according to claim 1, wherein the data exchange controller is further configured to control the radar module to detect a level of a material within the container at predetermined time intervals.

9. The fill level measuring system according to claim 1, wherein the data exchange controller is further configured to transmit an identification signal along with the information from the radar module.

10. The fill level measuring system according to claim 1, wherein the data exchange controller includes an integrated circuit and a wireless transmitter.

11. The fill level measuring system according to claim 1, wherein the container is collapsible, and the radar module is deactivated when the container is in a collapsed condition as the second state.

12. A container, comprising:
    a base;
    a sidewall extending from the base;
    a fill level measuring device mounted to the sidewall, the fill level measuring device including:
        a housing in a longitudinal shape elongating along a first direction;

a radar device in the housing;

a data exchange controller in the housing and in communication with the radar device, the data exchange controller being configured to transmit information from the radar device to a user device;

a use condition detection sensor configured to:
  detect a first state and a second state of the housing, the first state being a state in which the first direction is perpendicular to a bottom of the container, the second state being a state in which the first direction is parallel to the bottom of the container; and
  generate a detection result; and a power source in the housing and connected to the radar device and data exchange controller, wherein each of the radar device and the data exchange controller is in an active state in response to the detection result corresponding to the first state, and each of the radar device and the data exchange controller is in a non-active state in response to the detection result corresponding to the second state.

13. The container according to claim 12, wherein the sidewall includes a recess and the fill level measuring device is mounted within the recess.

14. The container according to claim 12, wherein the power source is a battery and the fill level measuring device includes a battery monitoring circuit for monitoring a battery charge level of the battery and providing a low battery signal to the data exchange controller when the battery charge level is below a predetermined level.

15. The container according to claim 12, wherein the radar device includes an antenna that is mounted on one of an integrated circuit or a printed wiring board.

16. The container according to claim 15, wherein the housing includes a lens adjacent to the antenna.

17. The container according to claim 12, wherein the radar device is further configured to control a radar beam that is angled downward from the sidewall toward the base of the container and determines a distance that a material is filled within the container.

18. The container according to claim 12, wherein the data exchange controller is further configured to control the radar device to detect a level of a material within the container.

* * * * *